US009403669B2

(12) United States Patent
Fusy (10) Patent No.: US 9,403,669 B2
(45) Date of Patent: Aug. 2, 2016

(54) BALANCED LOADING ARM WITHOUT A BASE FOR TRANSFERRING A FLUID PRODUCT

(75) Inventor: Joël Fusy, Vincelles (FR)

(73) Assignee: FMC Technologies SA, Sens (FR)

( * ) Notice: Subject to any disclaimer, the term of this patent is extended or adjusted under 35 U.S.C. 154(b) by 97 days.

(21) Appl. No.: 13/820,129

(22) PCT Filed: May 17, 2011

(86) PCT No.: PCT/IB2011/052152
§ 371 (c)(1),
(2), (4) Date: May 21, 2013

(87) PCT Pub. No.: WO2012/028969
PCT Pub. Date: Mar. 8, 2012

(65) Prior Publication Data
US 2013/0240683 A1     Sep. 19, 2013

(30) Foreign Application Priority Data

Sep. 1, 2010 (FR) ...................................... 10 56948

(51) Int. Cl.
*E03B 1/00* (2006.01)
*B67D 9/02* (2010.01)
*F16L 3/20* (2006.01)

(52) U.S. Cl.
CPC .... *B67D 9/02* (2013.01); *F16L 3/20* (2013.01)

(58) Field of Classification Search
USPC ................. 137/615, 899.2; 141/387; 212/310; 244/135 A; 406/38
See application file for complete search history.

(56) References Cited

U.S. PATENT DOCUMENTS

| 2,980,150 | A | * | 4/1961 | Bily | 141/387 |
|---|---|---|---|---|---|
| 3,073,343 | A | * | 1/1963 | Mowell et al. | 137/615 |
| 3,085,593 | A | * | 4/1963 | Sorensen | 137/615 |
| 3,096,797 | A | * | 7/1963 | Bily | 141/387 |
| RE25,855 | E | * | 9/1965 | Mowell et al. | 137/615 |
| 3,236,259 | A | * | 2/1966 | Ashton | 137/615 |
| 3,340,907 | A | * | 9/1967 | Bily | 141/387 |
| 3,362,432 | A | * | 1/1968 | Jameson | 137/615 |
| 3,382,893 | A | * | 5/1968 | Bily | 137/615 |
| 3,409,047 | A | * | 11/1968 | Jameson | 137/615 |
| 3,434,491 | A | | 3/1969 | Bily | |
| 3,434,497 | A | * | 3/1969 | Bily | 137/615 |
| 3,442,307 | A | * | 5/1969 | Jameson | 141/387 |
| 3,455,333 | A | * | 7/1969 | Bily | 137/615 |

(Continued)

FOREIGN PATENT DOCUMENTS

| GB | 1 395 909 | 5/1975 |
|---|---|---|
| GB | 1 591 646 | 6/1981 |
| NL | 46167 | 2/1939 |

*Primary Examiner* — Bradley Duckworth (57) ABSTRACT

The invention provides a balanced arm (201) for transferring a fluid product, having a transfer compass comprising an inner transfer member (208) and an outer transfer member (221), articulated together, and a counterweight system (203) for balancing the transfer compass, characterized in that the compass is installed on a turntable (215) rotatable about a vertical axis, to rotationally drive the transfer compass about that axis, and the balancing system comprises at least one counterweight (207; 207') mounted so as to be able to turn about an axis (206) of horizontal general orientation, on a support (251) fixed to the turntable and functionally linked to the inner transfer member to provide the balancing of the transfer compass.

24 Claims, 4 Drawing Sheets

(56) References Cited

U.S. PATENT DOCUMENTS

| | | | |
|---|---|---|---|
| 3,556,148 A * | 1/1971 | Bily | 137/615 |
| 3,581,769 A * | 6/1971 | Haley et al. | 137/615 |
| RE27,343 E * | 4/1972 | Jameson | 141/387 |
| 3,675,680 A * | 7/1972 | Frohlich et al. | 137/615 |
| 3,805,834 A * | 4/1974 | Bily | 137/615 |
| 3,889,728 A * | 6/1975 | Riche | 141/387 |
| 3,896,841 A * | 7/1975 | Bahlke | 137/271 |
| 3,960,176 A * | 6/1976 | Chino et al. | 137/615 |
| 4,022,498 A * | 5/1977 | Jameson | 285/16 |
| 4,029,126 A * | 6/1977 | Miyazaki et al. | 137/615 |
| 4,050,585 A * | 9/1977 | Wilms | 137/615 |
| 4,093,003 A * | 6/1978 | Miller et al. | 137/615 |
| 4,114,662 A * | 9/1978 | Goodacre et al. | 141/387 |
| 4,205,308 A * | 5/1980 | Haley et al. | 340/685 |
| 4,276,917 A * | 7/1981 | Fujita | 141/387 |
| 4,408,943 A * | 10/1983 | McTamaney et al. | 137/899.2 |
| 4,416,306 A * | 11/1983 | Le Devehat | 137/615 |
| 4,418,718 A * | 12/1983 | Fusy | 137/615 |
| 4,548,236 A * | 10/1985 | Bloomquist | 137/615 |
| 4,658,874 A * | 4/1987 | von Meyerinck et al. | 141/387 |
| 4,715,404 A * | 12/1987 | Fusy | 137/615 |
| 4,899,776 A * | 2/1990 | Le Devehat | 137/15.07 |
| 4,987,925 A * | 1/1991 | Vroonland | 137/615 |
| 5,836,361 A * | 11/1998 | Koncsek | 141/279 |
| 6,000,428 A * | 12/1999 | Berberat | 137/615 |
| 6,923,225 B2 * | 8/2005 | Poldervaart et al. | 141/387 |
| 7,147,022 B2 * | 12/2006 | Le Devehat | 141/387 |
| 7,954,512 B2 * | 6/2011 | Le Devehat | 137/615 |
| 8,006,850 B2 * | 8/2011 | Rotheisler | 212/196 |
| 8,122,919 B2 * | 2/2012 | Park | 141/279 |
| 8,746,634 B2 * | 6/2014 | Rotheisler et al. | 248/123.2 |
| 2004/0099336 A1 * | 5/2004 | Le Devehat | 141/387 |
| 2004/0108003 A1 * | 6/2004 | Schwing et al. | 137/615 |
| 2009/0065078 A1 * | 3/2009 | Le Devehat | 137/615 |
| 2009/0165874 A1 * | 7/2009 | Pollack et al. | 137/615 |
| 2010/0313977 A1 * | 12/2010 | Sylard | 137/615 |

\* cited by examiner

BALANCED LOADING ARM WITHOUT A BASE FOR TRANSFERRING A FLUID PRODUCT

BACKGROUND OF THE INVENTION

The invention relates to a balanced arm for transferring (loading and/or unloading) a fluid product, such as petroleum products (liquefied natural gas, etc.).

It relates more particularly to a double-counterweight marine loading arm, equipped with a hydraulic coupler enabling transfer to be made between two ships moored side by side, between a ship and a platform or floating barge moored side by side, or between a jetty on which the loading arm is installed and a ship moored beside that jetty.

Examples of this kind of arm are described in the patent documents WO02/22491 and GB 1395909. One of the main drawbacks of the arms described in these documents is that their fixed base, which is relatively high, does not enable easy access to the arm, in particular for maintenance operations.

Arms without a base do exist, of the kind described in document U.S. Pat. No. 4,408,943, but their accessibility is not necessarily better, in particular due to the encumbrance generated by the tensioning systems implemented.

SUMMARY OF THE INVENTION

The invention is directed in particular to mitigating these drawbacks. It thus provides a balanced arm for transferring a fluid product, having a transfer compass comprising an inner transfer member and an outer transfer member, articulated together, and a counterweight system for balancing the transfer compass, characterized in that the compass is installed on a turntable rotatable about a vertical axis, to rotationally drive the transfer compass about that axis, and the balancing system comprises at least one counterweight mounted so as to be able to turn about an axis of horizontal general orientation, on a support fixed to the turntable and functionally linked to the inner transfer member to provide the balancing of the transfer compass.

Such an arm not only provides a response to the needs which have just been mentioned but also leads to other advantages. To be precise, these provisions enable the conventional base of loading arms to be eliminated, with the benefit of reducing the length of the arm for the same working zone, and/or of the possibility of reaching lower connection zones than those accessible conventionally.

Furthermore, the aforementioned provisions enable the compass that forms the arm to be brought down to ground level, without this incurring the penalty of a more complex structure, the constitutive members of which could in turn hinder the access to the arm.

According to other provisions of the invention, which may be implemented independently or in combination, in particular on account of their convenience of manufacture or use:

the inner transfer member or the outer transfer member is self-supporting or is carried by a support structure;

the inner transfer member is supported so as to be able to turn about another axis of horizontal general orientation and the outer transfer member comprises an outer end provided with coupling means to couple the arm to a complementary pipe for the fluid product;

the balancing of the compass is provided by a pantograph system comprising a first pulley rotatably mounted on a support and bearing a primary counterweight and a second pulley rotationally coupled to the inner transfer member, and linked to the first pulley by an endless cable, for it to be rotationally driven;

the support is a mast;

the mast is permanently fixed to the turntable;

the primary counterweight is carried by a beam fixed to the first pulley;

it comprises a pantograph system for balancing the outer transfer member, comprising an idler pulley mounted coaxially with said other axis of horizontal general orientation and bearing a secondary counterweight and a second pulley rotationally coupled to the outer transfer member, about an additional axis of horizontal general orientation, and linked to the idler pulley by an endless cable for it to be driven rotationally;

the first pantograph system and/or the second pantograph system are each actuated by a motor assembly;

the motor assembly comprises at least one jack;

the secondary counterweight is mounted on a beam fixed to the pulley;

the balancing of the compass is achieved by a balancing system comprising a load-bearing structure on which there is rotatably articulated, about the axis of horizontal general orientation, a balancing beam carrying at least one primary counterweight, and which is linked to the inner transfer member by a rigid or flexible link;

the rigid link is a beam rotatably articulated to the balancing beam, as well as to the inner tube;

the flexible link is a cable, a chain, or a cord;

the inner transfer member is connected, by an assembly of bends and of a swivel joint of axis of horizontal general orientation defining said other axis of horizontal general orientation, to a duct for supplying the arm with fluid product or for retrieval of the fluid product unloaded by the arm;

the assembly is carried by a support surrounding a vertical part of the duct;

the support is a column;

the axis of horizontal general orientation extends at the same level as or above said other axis of horizontal general orientation;

the load-bearing structure has the form of a clevis;

the inner transfer member is carried by a support structure rotatably articulated on the load-bearing structure by the interposition of a rolling bearing between each vertical branch of the clevis;

the vertical part of the duct passes centrally through the turntable;

the inner transfer member is connected to an assembly of bends and of a swivel joint defining said other axis of horizontal general orientation, between the pulleys of the balancing pantograph systems of the balancing compass of the outer transfer member, by means of a sleeve provided with a cut-out, which is interposed between the two pulleys, and which is mounted so as to be able to turn about said other axis of horizontal general orientation and adapted to enable the connection of the inner tube to a bend of the assembly and the rotational driving of that inner tube;

the vertical part of the duct extends along an axis which does not coincide with that of the turntable and is connected to a fixed duct by articulated tubing comprising swivel joints of generally vertically oriented axis;

the support for the balancing counterweight or counterweights of the compass extends to the apex of the compass when the compass is in stored position, and comprises means for accessing the compass;

the support further comprises means for locking the compass in stored position.

BRIEF DESCRIPTION OF THE DRAWINGS

Other features and advantages of the invention will emerge from the following description, which is made with reference to the accompanying drawings, in which.

DETAILED DESCRIPTION OF THE INVENTION

FIGS. 1 to 8 represent four double-counterweight arms for transferring a fluid product in accordance with the invention, and present four embodiments of the main balancing system.

They are, for example, balanced marine arms for transferring fluid products, in particular petroleum products, such as liquefied natural gas, serving for the loading of a tanker ship provided with an appropriate duct or pipe, from a fixed reservoir to which the arm is permanently connected.

Figure 3:
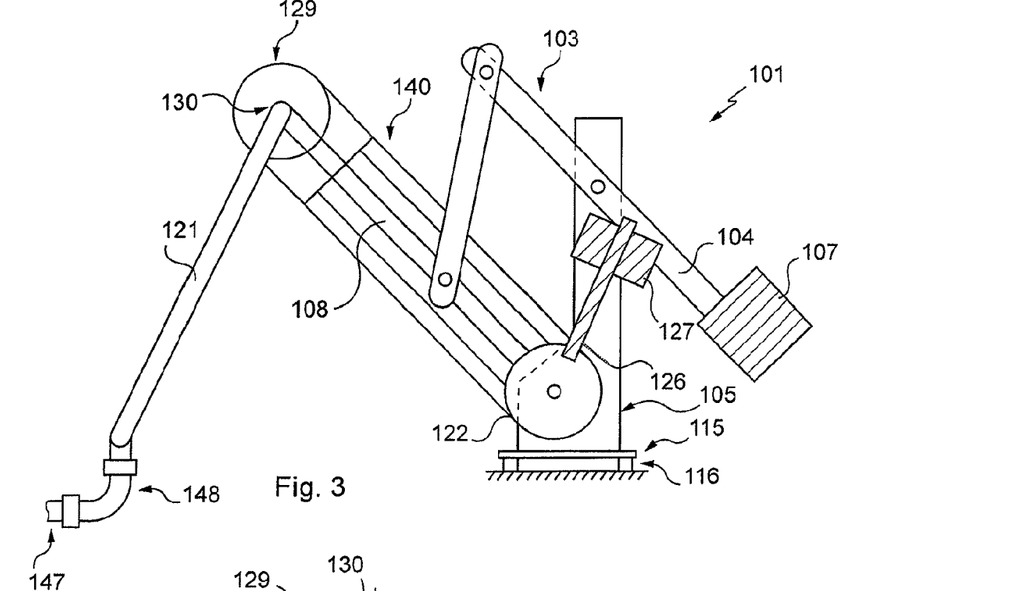
FIG. 3 is a very diagrammatic side view of a second embodiment of a loading arm in accordance with the invention.

In these forms of embodiment which are chosen only by way of example to illustrate the application of the invention, these loading arms generally comprise a deformable tubular portion adapted to be connected to a fixed pipe leading to a reservoir (not shown) and terminating with a coupler, with a hydraulic motor, or any other device for connection/disconnection (coupling) of known type, represented only in FIG. 3 and adapted to be connected to a second duct (not shown) carried by the tanker ship, itself not shown.

This hydraulic coupler is linked by an assembly of bends and swivel joints, here cryogenic and of Chiksan® swivel joint type, at the free end of the deformable tubular portion. The assembly of bends and swivels is, in practice, a style 80 equipped with an Emergency Release System (ERS) and a Quick Connect-Disconnect Coupler (QCDC). This Quick Connect-Disconnect Coupler functions in normal operation.

It is to be recalled here that the expressions "style 40" and "style 50" are known in the field, one of which defines a connector or swivel joint the two ends of which are each welded to a bend, and the other of which defines the combination of a first swivel connector, then a bend, then a second swivel connector forming an angle of 90° to the first connector, then a bend. A style 80 corresponds to a style 50 to which a third connector has been added parallel to the first connector and connected to the second one by a bend. The swivel joints of these styles are all cryogenic, here of Chiksan® swivel joint type.

The deformable tubular portion mainly comprises two tubes or transfer members connected by a horizontal axis swivel joint (style 40), thereby forming a compass of variable span. One of these tubes, referred to as inner tube, is adapted to be connected via a style 50 to a duct adapted to fluidically connect the loading arm to a reservoir whereas the other tube, referred to as outer tube, is connected, as stated above, to a coupler.

With the movable deformable tubular portion there are associated balancing systems with counterweights adapted to make it possible for the arm, when empty, to remain stable in any configuration. This is necessary for the proper progression of the coupling and uncoupling operations of the arm to the movable duct. There is thus no great force to provide to maintain the arm in position.

The main balancing, that is to say of the movable members of the arm which are the inner and outer tubes articulated together as well as the coupling assembly formed by the hydraulic coupler and the means for connecting the latter to the outer tube, is provided by means of at least one primary counterweight, the arrangement of which is described in more detail below. A balancing system for the section of outer tube and of the aforementioned coupling assembly, is provided here. It takes the form of a pantograph system which comprises at least one secondary counterweight mounted on a beam that is fixed to a first pulley mounted so as to be rotatable about a horizontal axis independently of the inner tube also pivoting about that axis, and a second pulley rotationally coupled to the outer tube and mounted so as to turn about the horizontal axis defined by the horizontal axis swivel connector linking the outer tube to the inner tube, also independently of the inner tube. An endless cable or the like links these pulleys together.

Moreover, jacks constitute actuating devices for these inner and outer tubes.

The loading arms as have just been described are well-known to the person skilled in the art and will not be described in more detail here.

The following portion of the description relates more particularly to the four embodiments of the main balancing systems in accordance with the invention.

Figures 1, 2:
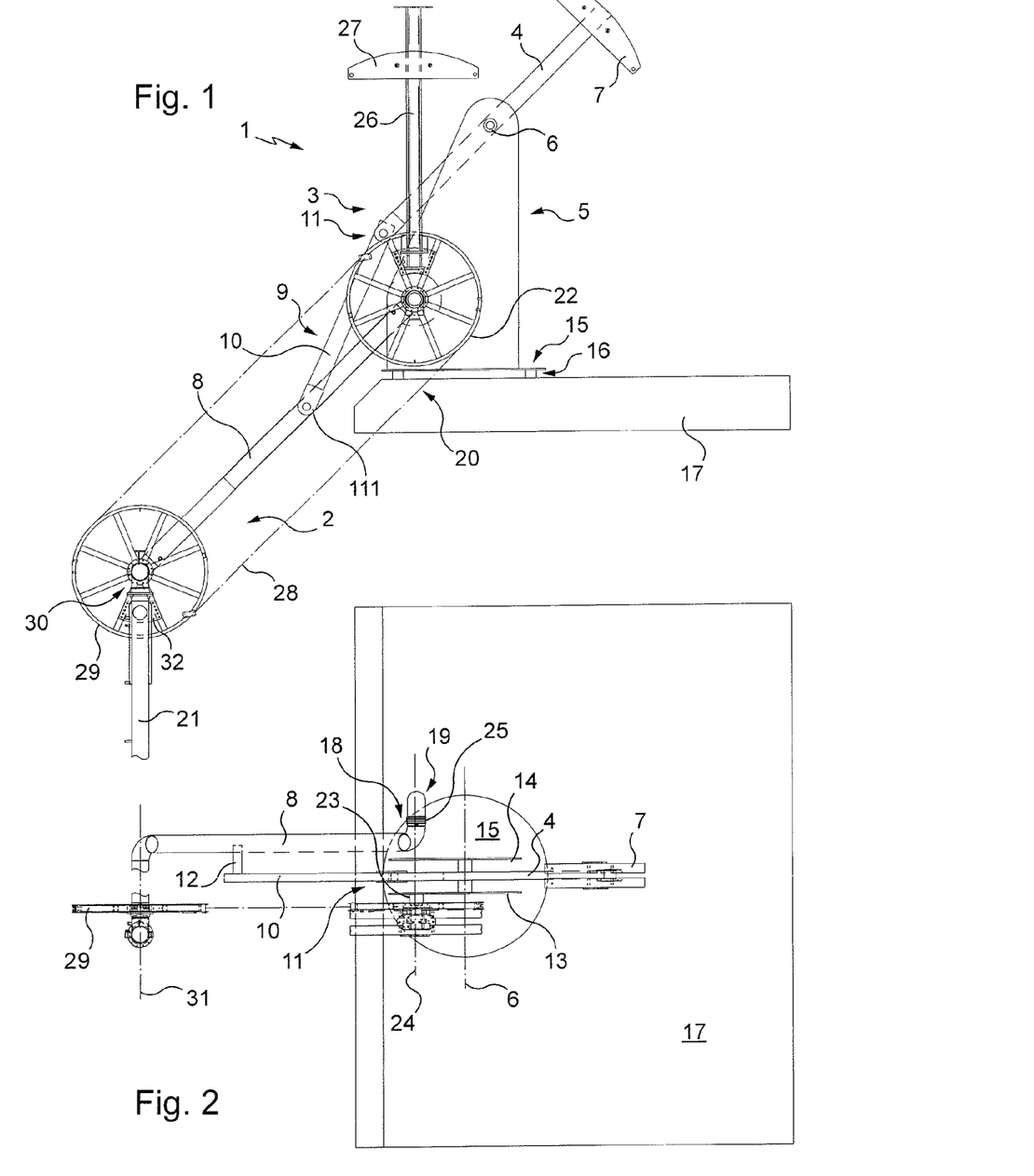
FIG. 1 represents a side view of a loading arm in accordance with a first embodiment of the invention.
FIG. 2 is a view from above of the same loading arm.

In the case of the embodiment of FIGS. 1 and 2, in which the loading arm 1 is represented in a position for low connection by means of a coupler adapted to be linked to the terminal coupling of the outer tube (not represented in the Figures), the deformable tubular portion 2 is self-supporting and the main balancing 3 is achieved by means of a beam 4 mounted on a load-bearing structure 5 so as to be able to turn about a horizontal axis 6.

To that end, on a rear half, that is to say extending in operation towards the rear of the load-bearing structure 5, the beam 4 carries a counterweight 7 divided into two parts and is connected, at its opposite longitudinal end (front end), to the inner tube 8 by a rigid link 9.

More particularly, the counterweight 7 is, here, fixed to the longitudinal end of the beam 4 and, at the opposite longitudinal end, the beam 4 is linked to a second beam 10 by a forked articulation 11 and the second beam 10 is, itself, pivotally articulated to the inner tube 8 by means of a journal 111 fixed to that inner tube 8.

The load-bearing structure 5 takes the form of a clevis between the branches 13, 14 of which is mounted the main beam 4 and of which the base is formed by a turntable 15 which is itself mounted on a rolling bearing 16 of vertical axis enabling the loading arm 1 to turn to the right and to the left on the quay 17 where that arm 1 is here installed.

As necessary, several rolling bearings may be employed for this mounting. It will also be noted that the link between the main beam and the inner tube, which is rigid here, may be replaced, in other embodiments, by a flexible link, of cable, chain, cord, etc. type.

In the case of this embodiment, the inner tube 8 is connected, at its lower end, via the style "50" 18 to a tubular portion of duct 19 extending vertically beside the turntable 15. On the opposite side of the load-bearing structure 5 to the side neighboring that tubular portion 19, is arranged the pantograph system 20 for balancing the outer tube 21. More particularly, the inner pulley 22 is mounted on the corresponding vertical branch 13 of the load-bearing structure 5 by means of a shaft 23, so as to be rotatable about a horizontal axis 24, here coinciding with that of the horizontal axis swivel joint 25 of the style "50". A beam 26 bearing a secondary counterweight 27, also divided here into two parts, is fixed to that pulley, which is, furthermore, linked by an endless cable, the path 28 of which is represented by dashed lines in FIGS. 1 and 2, to an upper idler pulley 29 mounted on the style "40" 30, co-axially to the horizontal axis 31 defined by its swivel joint. The upper pulley 29 is, furthermore, joined to the outer tube 21 by means of a tee 32.

Actuating jacks for the main and secondary balancing systems are, furthermore, provided for maneuvering the arm 1. In the interest of simplification, they are not represented in FIGS. 1 and 2. They may, in practice, be jacks of the kind represented in FIGS. 5 and 7.

As can be seen in those Figures, the main balancing rotational axis 6 is provided here above the rotational axis 24 of the inner tube 8. It can also be seen that this arm 1 in accordance with the invention enables in particular to reach very low connection zones.

Figure 4:
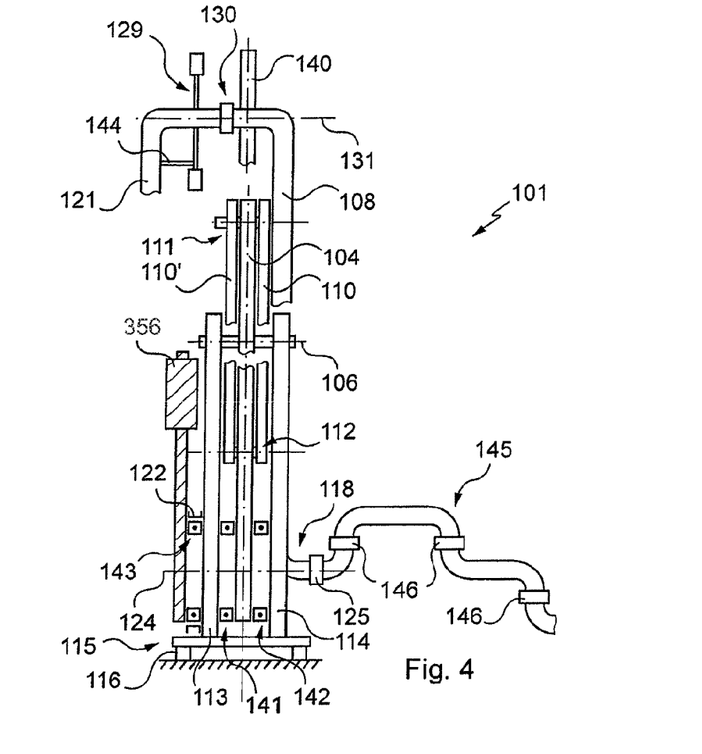
FIG. 4 is a back view of the arm of FIG. 3.

A second embodiment has been represented very diagrammatically in FIGS. 3 and 4, to illustrate the structure of a loading arm 101 in accordance with the present invention, when a support structure 140 of the duct compass is implemented.

In this case, only the inner tube 108 is provided here with such a support structure, even though, in other embodiments, the entire duct compass, that is to say the deformable tubular portion, could be carried by a structure compass.

In practice, it is a support structure 140 known per se which is shown between the two branches 113, 114 of the load-bearing structure 105 so as to pivot about the horizontal rotational axis 124 of the inner tube defined by the horizontal axis swivel joint 125 of the style "50" 118, by interposition of two horizontal axis rolling bearings 141, 142 between those branches 113, 114 and the support structure 140.

The main balancing system 103 here also comprises a beam 104 bearing a primary counterweight 107, but in the case of this embodiment this counterweight is linked to the support structure 140 by means of two rigid links, taking the form of two secondary beams 110, 110' extending parallel to each other and rotatably articulated to the main beam 104 and also to the support structure 140 of the inner tube 108, on respective opposite sides of the latter and of the main beam 104.

It will also be noted that the lower pulley 122 of the secondary balancing pantograph for the outer tube 121 which bears the secondary counterweight 127 by means of a beam 126, is also rotatably mounted on the neighboring branch 113 of the load-bearing structure 105 by means of a rolling bearing 143, coaxially with the horizontal axis 124, defined by the two rolling bearings 141, 142 and the aforementioned swivel joint 125, whereas the upper pulley 129 of this pantograph system is, here too, mounted as an idler pulley on the style "40" 130, coaxially to the horizontal axis 131 formed by its swivel joint, while being connected to the outer tube 121 by virtue of a transversely linking arm 5 144. In the case of the implementation of a support structure for the outer tube, this upper pulley may be mounted as an idler pulley on that structure.

It will also be noted here that the style "50" 118 is connected to tubing 145, itself connected to a fixed duct leading to a tank formed by several sections connected by vertical axis swivel joints 146, in order for that tubing 145 to be able to follow the rotational movement of the loading arm 101 towards the right or towards the left about a vertical axis (not shown).

As may also be seen in FIGS. 3 and 4, the outer tube 121 is provided here with a hydraulic coupler 147 linked to that tube by a style "80" 148. Quick connect-disconnect means for emergency may of course also be provided in normal operation, as stated above.

Although not visible in FIGS. 3 and 4, the inner tube 108 has a curved lower end between its zone for connection to the style "50" 118 and its part extending parallel to the support structure 140 which bears it.

This loading arm is otherwise similar to that of FIGS. 1 and 2 and identical or similar parts or structures, fulfilling the same function, have been attributed with the same numerical reference, to which the FIG. 100 has been added. Similarly, the values 200 and 300 have been added to parts identical or similar to those of FIGS. 1 and 2 in the two embodiments which will now be described.

These mainly differ from the preceding embodiment in the implementation of a second main balancing pantograph system, the primary counterweight then being carried by a support of its own, disposed behind the deformable tubular portion.

Figure 5:
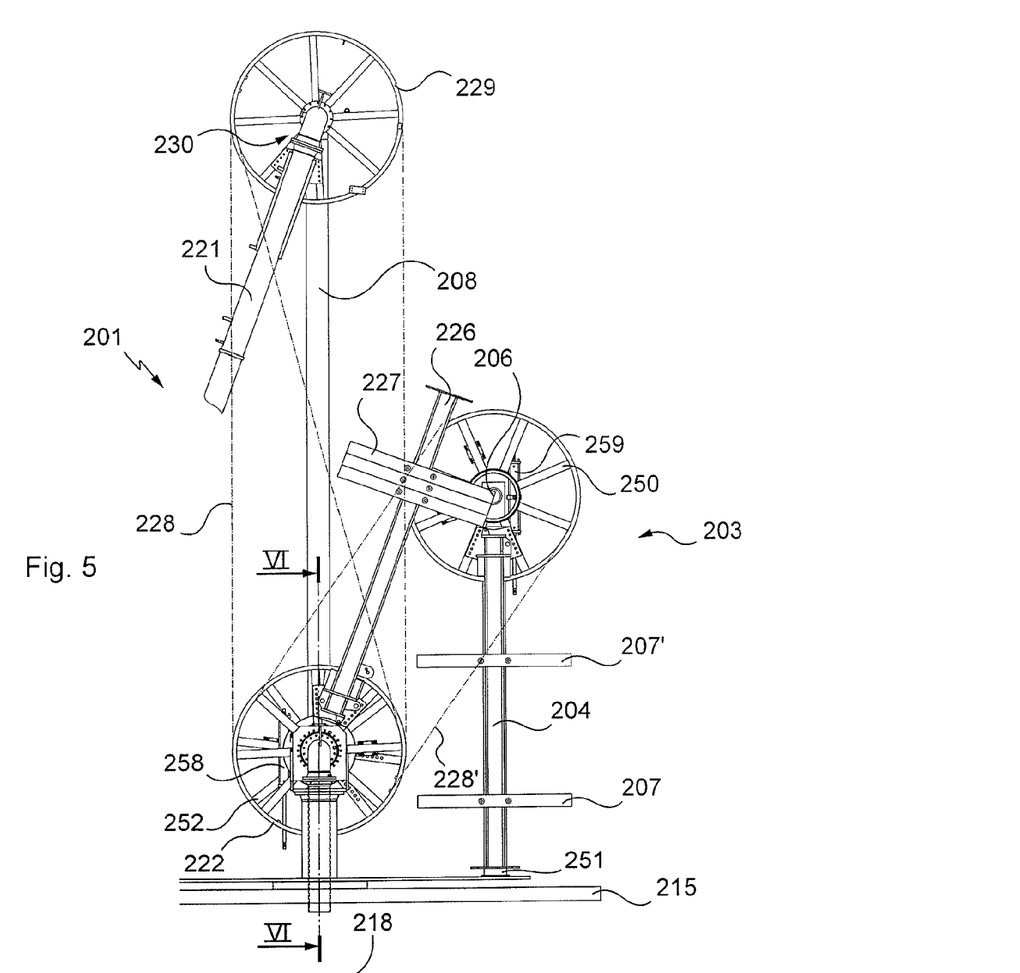
FIG. 5 is a side view of a third embodiment of a loading arm in accordance with the invention.
Figure 6:
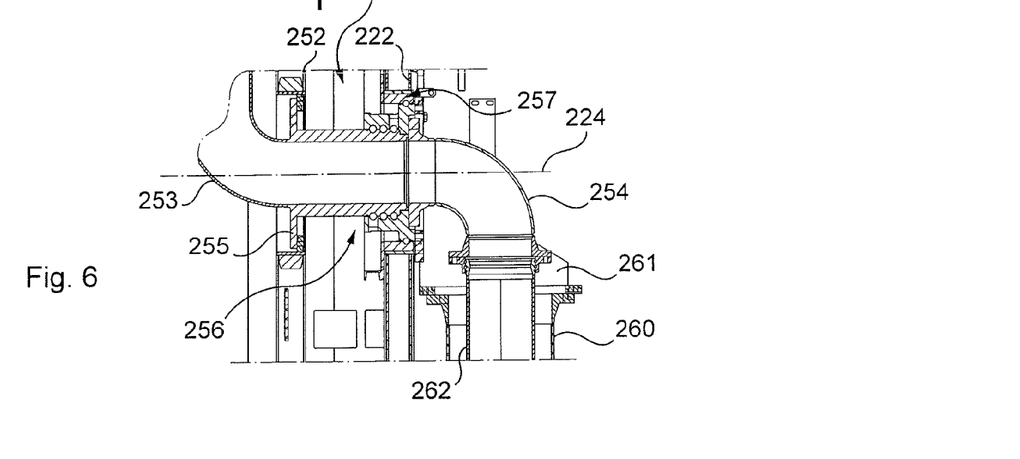
FIG. 6 is a cross-section view on line VI-VI of FIG. 5.

More particularly, with reference to FIGS. 5 and 6, the main balancing assembly 203 comprises a beam 204 bearing two primary counterweights 207,207', each divided into two parts, and which is fixed by one of its longitudinal ends to a pulley 250 rotatably mounted on a mast 251, itself fixed to the turntable 215 carrying the loading arm 201, about a horizontal axis 206 which here extends above the rotational axis 224 of the inner tube 208, parallel to the latter. This pulley 250 is connected by an endless cable, the path 228' of which is shown by dashed line in FIG. 5, to another pulley 252 of the 5 main balancing pantograph system which, like the lower pulley 222 of the balancing pantograph system of the outer tube 221, is mounted so as to be able to turn about the horizontal rotational axis 224 of the inner tube 208.

In practice, these two pulleys are mounted on the style "50" 218, between the two bends 253, 254, thereof, the pulley 252 of the main balancing pantograph being joined to the inner tube 208 by fixing of a coupling 255 extending perpendicularly to the rotational axis 224 of the inner tube 208 and which is formed as one piece with the swivel joint 256 of the style "50".

As for the lower pulley 222 of the balancing pantograph system for the outer tube 221, this is mounted as an idler pulley on that style "50" by means of a ball bearing 257.

Two actuating jacks 258, 259 are moreover provided to actuate each of the pantograph systems, for the purpose of unfolding the loading arm to reach its position for connection of its coupler to a complementary duct, or, conversely, to bring it back to its resting position corresponding to that represented in FIG. 5.

Jack 258 serves to maneuver the outer tube and jack 259 serves to maneuver the inner tube.

Here, as is known per se, these are jacks with two rods each provided with a returning pulley (not shown), onto which a cable winds. The latter moreover winds around a pulley for driving the associated balancing pulley.

Without this being limiting, it is also possible to employ rigging known per se with two jacks fixed to the inner tube of which the two rods are linked by a cable. This same cable is equipped with a crimped sleeve placed in a fixed drive pulley.

It is also to be noted that the inner tube 208 is carried by a column 260 projecting from the turntable 215, at the center thereof, by virtue of a gusset 261 fixed thereto and to which the style "50" is also fixed (see FIG. 6). As regards the lower bend 254 of this style "50", this is connected to a vertical duct portion 262 extending within that column 260, co-axially therewith, and, forming part of a duct for connecting the tubular portion of the loading arm to a tank, in similar manner to that described for the preceding embodiment.

For this embodiment as well as the other described here, the load-bearing structural part of the articulated balancing assembly of the compass may be raised to reach the apex of the arm in stored position to comprise accesses to the maintenance points on the arm by ladders and platforms. It may also comprise locking means which serve to maintain the arm in stored position for extreme conditions.

This loading arm is otherwise similar to that of the embodiment of FIGS. 1 and 2.

Figure 7:
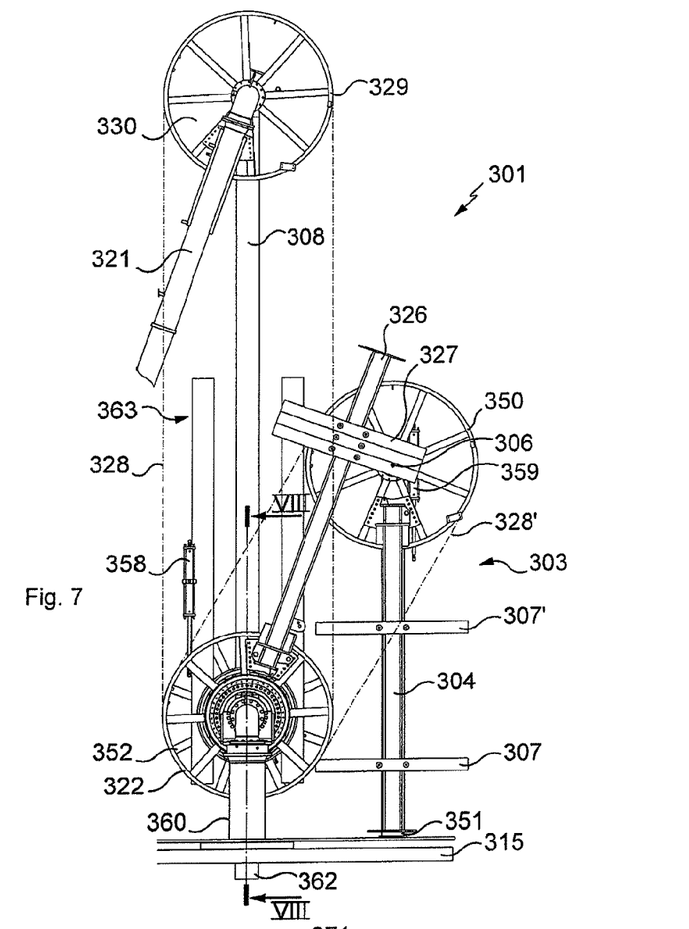
FIG. 7 is a side view of a fourth embodiment of a loading arm in accordance with the invention.
Figure 8:
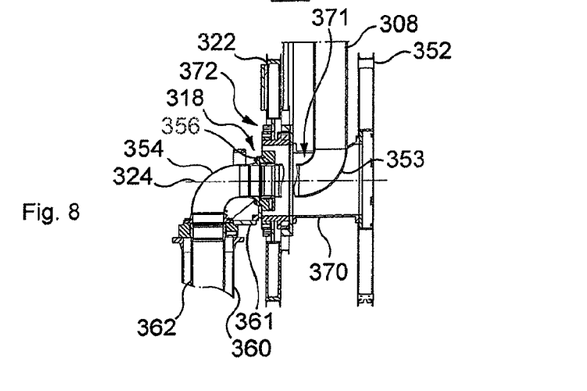
FIG. 8 is a cross-section view on line VIII-VIII of FIG. 7.

The embodiment of FIGS. 7 and 8 differs from the previous one by the fact that the inner tube 308 extends between the two coaxial pulleys 352, 322 of the main and secondary balancing pantograph systems, by the implementation of a sleeve 370 interposed between those two pulleys and provided by a cut-out 371 enabling the inner tube 308 to be connected to the upper elbow 353 of the style "50" 318. The pulley 352 of the main balancing system turning about the rotational axis 324 of the inner tube 308 is fixed to the outer end of that sleeve 370 and, in operation, drives the inner tube 308 by direct mechanical transmission, the latter being directly fixed to the support structure 363 (two columns in practice) of the inner tube by bolted assembly, the assembly formed with the inner tube 308 and the support structure 363 25 being rotatably mounted on the gusset 361 supporting the deformable tubular portion of the loading arm 301, by virtue of a rolling bearing of structure 372 surrounding the swivel joint 356 of the style "50" 318 and on which the lower pulley 322 of the secondary balancing pantograph is also mounted as an idler pulley. This embodiment is otherwise similar to the preceding embodiment. It will not 30 therefore be described in more detail here.

Advantages of the invention, as it has just been described, are the following:

1) Absence of a base. The arm may thus be shorter and/or reach lower connection zones than usual.

2) optimization of the separation between arms; less interference between them when several arms are implemented.

3) mass and, thereby, center of gravity, brought as close as possible to the ground.

4) no interaction of the balancing system on the product line and/or on the load-bearing structure of the inner tube (with the exception of the balancing forces).

5) easy assess to the maintenance points with a compass brought to ground level instead of being installed high up (on top of a base).

6) facility of access to the mechanical locking members of the arm in stored position.

7) possibility of putting walkways on the load-bearing structure of the balancing system, reducing the amount of equipment on the loading arms and eliminating certain risks of interference.

8) more compact solution than the existing solutions, enabling better accessibility and greater ease of maintenance.

9) the forces of the wind on the balancing system, in particular on the main balancing beam, are not transmitted to the members of the articulated loading arm, but directly to the turntable.

10) possibility of offsetting the rotational axis of the turntable with respect to the vertical rotational axis of the product line.

Of course, the invention is in no way limited to the embodiments described or represented, which are merely given by way of examples.

In particular, the invention comprises all the means constituting technical equivalents of the means described, as well as their combination.

The arm in accordance with the invention may also be used to transfer a product other than liquefied natural gas. Among these fluids, condensates in particular may be cited.

Moreover, additional lines may be implemented, for example a vapor return line.

The invention claimed is:

1. A balanced loading arm for transferring a fluid product from a first location having a support surface for the loading arm to a second location, the loading arm comprising:
    a transfer compass comprising an inner transfer member and an outer transfer member which are articulated together,
    a balancing system for balancing the transfer compass,
    a turntable on which the transfer compass is mounted, the turntable being rotatable about a vertical axis to thereby allow for rotation of the transfer compass about that axis,
    the turntable being mounted directly on the support surface via a bearing which is configured to enable the turntable to turn about the vertical axis; and
    an upstanding support which is mounted on the turntable in a fixed position relative to the turntable,
    wherein the balancing system comprises at least one primary counterweight which is connected to the support so as to be able to turn relative to the support about a first generally horizontal axis, the primary counter weight being functionally linked to the inner transfer member; and
    wherein the inner transfer member is supported so as to be able to turn about a second generally horizontal axis which is located below the first generally horizontal axis.

2. An arm according to claim 1, wherein the outer transfer member is carried by a support structure.

3. An arm according to claim 1, wherein the outer transfer member comprises an outer end which is provided with a coupler to couple the arm to a complementary pipe for the fluid product.

4. An arm according to claim 3, wherein the balancing system comprises a pantograph system comprising a first pulley which is rotatably mounted on the support and which bears the primary counterweight, and a second pulley which is coupled to the inner transfer member and is linked to the first pulley by an endless cable.

5. An arm according to claim 4, wherein the support comprises a mast having a lower end which is connected to the turntable and an upper end to which the first pulley is mounted.

6. An arm according to claim 4, wherein the primary counterweight is carried by a beam fixed to the first pulley.

7. An arm according to claim 4, further comprising a pantograph system for balancing the outer transfer member, the pantograph system comprising a third pulley which is mounted coaxially with the second generally horizontal axis and which bears a secondary counterweight, and a fourth pulley which is coupled to the outer transfer member and is linked to the third pulley by an endless cable.

8. An arm according to claim 7, wherein the pantograph system is actuated by a motor assembly.

9. An arm according to claim 8, wherein the motor assembly comprises at least one jack.

10. An arm according to claim 7, wherein the secondary counterweight is mounted on a beam which is fixed to the third pulley.

11. An arm according to claim 7, wherein the inner transfer member is connected to a swivel joint defining said second generally horizontal axis at a location between the second and third pulleys, the inner transfer member extending to the swivel joint through a cut-out in a sleeve which is interposed between the second and third pulleys and is mounted so as to be able to turn about said second generally horizontal axis.

12. An arm according to claim 3, wherein the first generally horizontal axis is located at a level at or above the second generally horizontal axis.

13. An arm according to claim 1, wherein the balancing system comprises a balancing beam to which the at least one primary counterweight is connected, the balancing beam being rotatably articulated to the support about the first generally horizontal axis and being linked to the inner transfer member by one of a rigid link or a flexible link.

14. An arm according to claim 13, wherein the balancing beam is linked to the inner transfer member by a rigid link which comprises a beam having a first end which is rotatably articulated to the balancing beam and a second end which is rotatably articulated to the inner transfer member.

15. An arm according to claim 13, wherein the balancing beam is linked to the inner transfer member by a flexible link which comprises one selected from the group consisting of a cable, a chain, or a cord.

16. An arm according to claim 13, wherein the support has the form of a clevis comprising two vertical branches.

17. An arm according to claim 16, wherein the inner transfer member is carried by a support structure which is rotatably articulated on the support by the interposition of a rolling bearing between the support structure and each vertical branch of the clevis.

18. An arm according to claim 1, wherein the inner transfer member is connected by a swivel joint having a horizontal axis corresponding to the second generally horizontal axis to a duct for supplying the arm with fluid product or for retrieving fluid product unloaded by the arm.

19. An arm according to claim 18, wherein the swivel joint is carried by a support member surrounding a vertical part of the duct.

20. An arm according to claim 19, wherein the support member comprises a column.

21. An arm according to claim 19, wherein the vertical part of the duct passes centrally through the turntable.

22. An arm according claim 18, wherein a vertical part of the duct extends along an axis which is offset from the vertical axis of the turntable and is connected to a fixed second duct by articulated tubing comprising a plurality of swivel joints having generally vertically oriented swivel axes.

23. An arm according to claim 1, wherein the support extends to an apex of the transfer compass when the transfer compass is in a stored position to thereby facilitate access to the compass.

24. A balanced loading arm for transferring a fluid product from a first location having a support surface for the loading arm to a second location, the loading arm comprising:
- a transfer compass comprising an inner transfer member and an outer transfer member which are articulated together;
- a balancing system for balancing the transfer compass;
- a turntable on which the transfer compass is mounted, the turntable being rotatable about a vertical axis to thereby allow for rotation of the transfer compass about that axis;
- the turntable being mounted on the support surface via a bearing which is configured to enable the turntable to turn about the vertical axis; and
- an upstanding support which is mounted on the turntable in a fixed position relative to the turntable;
- wherein the balancing system comprises at least one primary counterweight which is connected to the support so as to be able to turn relative to the support about a first generally horizontal axis, the primary counter weight being functionally linked to the inner transfer member;
- wherein the inner transfer member is supported so as to be able to turn about a second generally horizontal axis which is located below the first generally horizontal axis; and
- wherein the balancing system further comprises a first pulley which is rotatably mounted on the support coaxially with the second horizontal axis, a secondary counterweight which is connected to the first pulley, and a second pulley which is coupled to the outer transfer member and is linked to the first pulley by an endless cable.

\* \* \* \* \*